Dec. 2, 1941.　　M. M. SAMUELS ET AL　　2,264,773
INSULATOR SUPPORTING BRACKET FOR ELECTRICAL TRANSMISSION LINES
Filed Feb. 16, 1940　　2 Sheets-Sheet 1
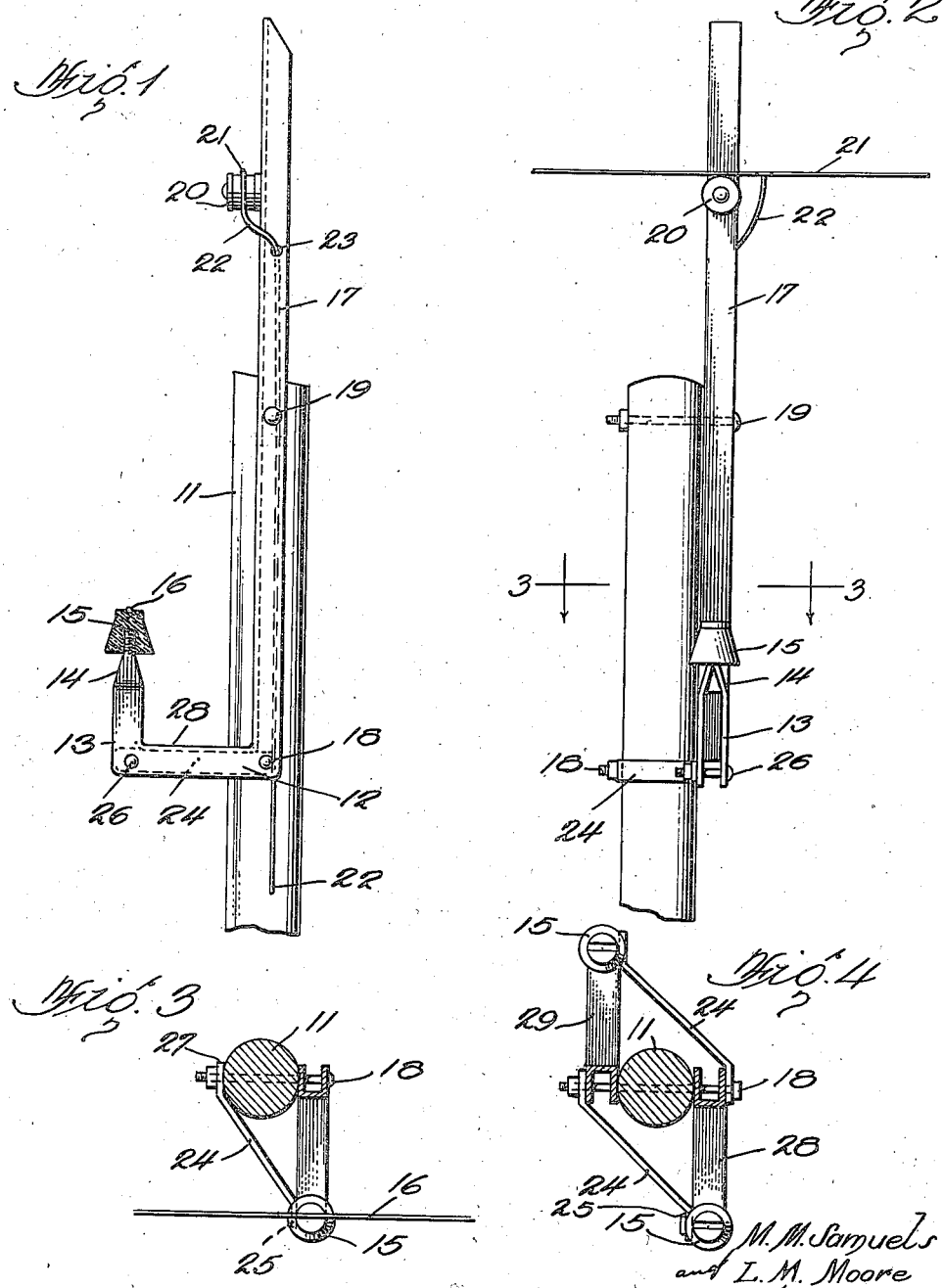
M. M. Samuels
and L. M. Moore
Inventors

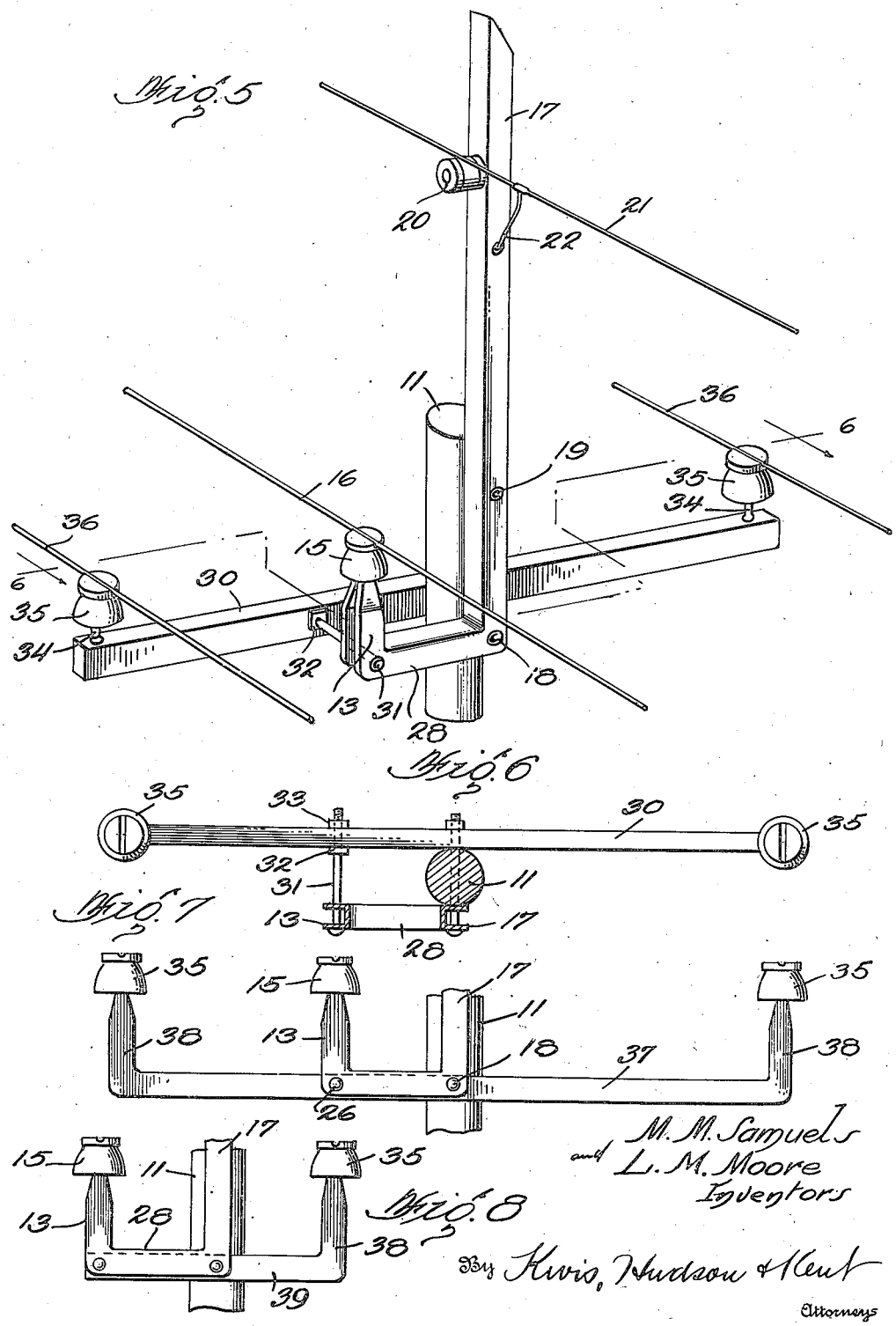

Patented Dec. 2, 1941

2,264,773

UNITED STATES PATENT OFFICE 2,264,773

INSULATOR SUPPORTING BRACKET FOR ELECTRICAL TRANSMISSION LINES

Maurice M. Samuels and Leverett M. Moore, Washington, D. C., assignors to The Standard Transformer Company, Warren, Ohio, a corporation of Ohio Application February 16, 1940, Serial No. 319,368

5 Claims. (Cl. 248—220.5)

This invention, as described in detail in the following specification, relates to insulator supporting brackets for electrical transmission or distribution lines. In many conditions of service it is a matter of considerable importance to provide adequate safe electrical distribution lines with minimum expense for material and labor of installation. It is also important to have the equipment of a simple, rugged type which will not only be serviceable but which may be installed and maintained with the minimum of skilled labor.

We have invented a supporting bracket which meets the requirements of transmission and distribution systems as outlined above. Our invention also comprises combinations of the bracket unit by which varying types of electrical service may be provided and maintained by the interchangeable assembly of such bracket units.

One of the objects of our invention is the provision of a bracket unit formed of one integral section of angle iron or channel bar which will be adaptable for several different types of installation.

The bracket unit such as we have devised provides for the satisfactory support not only of one or more line wires but also a neutral or ground wire. It also serves as a lightning rod. Such a bracket element can be mounted upon a support with a minimum number of attaching means and will be ready for service without further attention.

One object of our invention is to so mount the improved bracket element either alone or in combination with similar elements so that it will be adequately braced against stresses and loads to which it may be subjected in service. Incidental to this purpose, the bracket element is suitably braced on its support to withstand any tendency toward rotation or similar deflection from the desired position.

A still further object of our invention is to provide supports in the form of brackets suitable for use with the standard or conventional cross-arms or in the alternative, on new construction projects, to take the place of the customary cross-arms and yet provide the usual arrangement of line supports or pin insulators.

It will be seen from the description of the invention that the devices provide suitable supports for whatever type of electric circuit may be found most desirable to install.

By way of examples of the preferred form which our invention may take, we have illustrated various modifications of the invention in the accompanying drawings in which Fig. 1 is a front elevation of our improved bracket mounted to provide a support for a single phase circuit consisting of two wires, one of which is a neutral or ground wire;

Fig. 2 is a side elevation of the same;

Fig. 3 is a horizontal section on the line 3—3 of Fig. 2;

Fig. 4 is a similar horizontal section of a modified form adapted for circuit having two conducting wires of different phases and a neutral or ground wire;

Fig. 5 is a perspective view of an adaptation of the improved bracket for a three-phase four-wire circuit including a neutral or ground wire;

Fig. 6 is a horizontal section of the same taken on the line 6—6 of Fig. 5;

Fig. 7 is a side elevation of a further modification also adapted for three-phase four-wire star circuits and Fig. 8 is a side elevation of a modified form for two conducting wires of different phases and a neutral or ground wire.

It is intended that our improved bracket support shall be adapted for mounting on a suitable pole or support 11.

The bracket itself is formed integrally from a single piece of rolled sheet metal which may be given a cross-section either of an angle or of a channel. Either of these cross-sections will supply sufficient rigidity to carry the estimated vertical load, wind load and unbalanced pull in the direction of the wiring itself.

The mid-portion 12 is arranged at right angles to a short end section 13. This section has flange extensions tapered at its upper end to form the threaded pin 14 upon which an insulator 15 may be attached in the usual manner. The insulator 15 serves as a support for the electric wire or conductor 16. This section 13 should be sufficiently long that birds perching on the mid-portion 12 will not be able to come in contact with the charged wire 16.

At the opposite end of the mid-portion 12 there is a long end section 17 extending in the same plane with the mid-portion 12 and the insulator support or short end section 13. The sections 13 and 17 are not only parallel but extend in the same direction from the mid-portion 12. The end section 17 is sufficiently long to project the desired distance above the end of the pole 11 thus serving as a lightning rod and also to carry the grounded conductor.

The bracket is mounted upon the pole 11 by means of two screw-threaded bolts or rods. The lower one 18 passes through both flanges of the channel shaped bracket and diametrically through the pole 11. It is located at the juncture between the mid-portion and the long end section. A second fastening means also in the form of a screw-threaded bolt or rod 19 passes transversely through the long end section at an intermediate point and clamps the latter to the pole 11.

The upper end of the section 17 has a knob, spool or any suitable fitting 20 which serves as a support for a neutral wire 21. A ground wire 22 runs from the neutral wire 21 through an aperture 23 in one flange of the end section and thence between the flanges of the end section and finally along the pole to the ground. Where the fitting 20 is an electrical conductor, the bracket itself serves as a conductor of the abnormal current surges received from the wire 21 and in such cases the ground wire may have its upper end connected at some suitable point along the bracket, for example at the bolt 18.

In order to resist any tendency of the bracket to twist on the pole, suitable means are provided to brace the bracket. As illustrated more particularly in Figs. 2 and 3 we have provided a brace 24 in the form of a flat metal band having its opposite ends bent angularly. One end 25 is bolted through the bracket at the juncture between its mid-portion and the insulator support by means of a short bolt 26. The opposite end 27 of the brace is clamped against the opposite side of the pole 11 by means of the long bolt 18. In this manner the pin support is held rigidly in a predetermined plane at right angles to the intended line of the wire 16.

The arrangement just described is suitable for a circuit of a single phase consisting only of the single conducting wire 16 and the neutral or grounding wire 21.

By the use of two or more of the brackets designed as above described, it is possible to provide for different circuits with varying numbers of wires. In Fig. 4 we have shown a variation of the arrangement by which the use of two identical brackets serves to support the wiring of a circuit consisting of two-phase wires and a neutral or ground.

Under such conditions two identical brackets 28 and 29 are mounted on opposite sides of the pole 11 by means of common bolts 18 and 19. The bolt 18 holds the opposite ends of the braces 24, 24. This gives an arrangement by which the brackets extend oppositely in parallel planes and are braced by means of braces which also extend parallel to each other from the insulator supports to the long sections of the opposite brackets.

In such an arrangement it is optional whether the long section 17 of the second bracket 29 extends vertically beyond the point of attachment with the screw-threaded bolt 19.

The bracket 28 is also suitable for use in conjunction with the standard conventional cross-arm 30 shown in Fig. 5. When so arranged the bracket may take the place of the angular braces usually found necessary to hold the cross-arm horizontal. In this arrangement the bolt 31 passing transversely through the brace at the angle of the mid-portion with the insulator support is extended for a length comparable with the bolt 18. The bolt 31 has a long screw-thread at its free end and two nuts 32 and 33 between which the cross-arm is clamped. As shown in Fig. 6 this provides a rectangular arrangement between the bracket, the cross-arm, the pole and the bolt 31. Thus the cross-arm and the bracket are mutually braced against lateral twisting.

The circuit for which this arrangement is primarily adapted comprises three wires and an additional ground wire. In addition to the wire 16 mounted upon the insulator 15 and insulator supporting pin 14, the circuit includes pins 34, 34 on opposite ends of the cross-arms and the usual insulators 35, 35 for the conducting wires 36, 36.

In new construction or where it is not desired to rely upon the usual timber cross-arms, it is found that an angle iron or channel bar of steel can be provided of equal serviceability. In Fig. 7 such an arrangement has been illustrated. It comprises a metal cross-arm 37 with integral ends 38, 38 forming pin supports for the insulators 35, 35 at the same level with the insulator 15 on the bracket. In this instance the cross-arm is of channel cross-section and fits within the flanges of the mid-portion of the bracket. It is held in position by the two bolts 18 and 26. Where this arrangement is followed it will be evident that the same brace 24 is used as shown in detail in Figs. 2 and 3.

The same circuit arrangements are possible with the metal cross-arm as already described with the standard timber cross-arm.

As an alternative for the arrangement shown in Fig. 7, and where only two conductors are needed, the cross-arm may have only one insulator support. In such a case as shown in Fig. 8, the cross-arm 39 will extend horizontally in each direction from the end section 17 for a distance equal only to the length of the mid-portion 28 of the bracket. In one direction the cross-arm fits within the flanges of the mid-portion 28. The oppositely extending portion, also of equal length carries the pin-supporting end 38. This arrangement of course is suitable for supporting two conductors with a grounded neutral wire on the long end section 17 of the bracket.

The above variations illustrate our perferred form of bracket and the wide extent to which it may be adapted for maintaining different types of electric transmission or distributing systems. Forms disclosed but not claimed here have been claimed in the copending divisional application for patent on a transmission line support filed October 21, 1941, Serial No. 415,982. It will be evident that the description and illustrations are mainly illustrative and numerous changes in materials, proportions and arrangements are possible within the scope of the appended claims.

What we claim is:

1. A bracket for attachment to a vertical support comprising an integral rolled sheet metal bar having a horizontal mid-portion, a short end section extending vertically at right angles to the mid-portion, a long end section in a common plane with the mid-portion and short end section and extending parallel to the latter and in the same direction, a bolt attaching the juncture of the mid-portion and the long end section to a support, a second bolt spaced above the first one and attaching the said long end section to the support and a horizontal brace connecting the juncture of the mid-portion and short end section to the support at a point laterally spaced from the plane of the bracket.

2. A bracket comprising an integral rolled sheet metal bar having a mid-portion, a short end section at right angles to the mid-portion, a long end section in a common plane with the mid-portion and short end section and extending parallel to the latter and in the same direction, a horizontal brace attached to the mid-portion at its juncture with the short end section and extending at an angle thereto, and brace fastening means extending transversely through the juncture of the mid-portion with the long end section, and adapted to clamp the bracket and brace to opposite sides of a support.

3. In combination with a vertically extending support, two brackets each comprising an integral rolled sheet metal bar having a mid-portion, a short end section at right angles to the mid-portion, a long end section in a common plane with the mid-portion and short end section and extending parallel to the latter and in the same plane, means for attaching said long end sections on opposite sides of said support, two braces each having one end attached to the mid-portion of one bracket at its juncture with the short end section, each brace having its opposite end overlying the other bracket at the juncture of its mid-portion with its long end section, and a common fastening means clamping both brackets and said overlying ends of the associated braces to opposite sides of a support.

4. In combination with a vertically extending support, two brackets each comprising an integral rolled sheet metal bar having a mid-portion, a short end section at right angles to the mid-portion, a long end section in a common plane with the mid-portion and short end section and extending parallel to the latter and in the same plane, a means for attaching said long end sections on opposite sides of said support, two braces each having one end attached to the mid-portion of one bracket at its juncture with the short end section, each brace having its opposite end overlying the other bracket at the juncture of its mid-portion with its long end section, and a common fastening means clamping both brackets and said overlying ends of the associated braces to opposite sides of a support with the mid-portions of the brackets extending parallel to each other in opposite directions and with the braces extending parallel to each other.

5. In combination with a vertically extending support, two brackets, each comprising an integral rolled sheet metal bar having a mid-portion, a short end section at right angles to the mid-portion, a long end section in a common plane with the mid-portion and short end section and extending parallel to the latter and in the same plane, means for attaching said long end sections on opposite sides of said support, two braces each having one end attached to the mid-portion of one bracket at its juncture with the short end section, each brace having its opposite end overlying the other bracket at the juncture of its mid-portion with its long end section, a common fastening means clamping both brackets and said overlying ends of the associated braces to opposite sides of the support and a second common fastening means clamping the intermediate portions of said long end sections to opposite sides of the support.

MAURICE M. SAMUELS.
LEVERETT M. MOORE.